(No Model.) 8 Sheets—Sheet 1.
E. P. BAVILLE.
MACHINE FOR THREADING SCREWS, BOLTS, AND NUTS.
No. 311,099. Patented Jan. 20, 1885.

Witnesses:
C. Sedgwick
A. H. Davis

Inventor:
E. P. Baville
By Munn & Co
Attorneys.

(No Model.) 8 Sheets—Sheet 2.

E. P. BAVILLE.
MACHINE FOR THREADING SCREWS, BOLTS, AND NUTS.

No. 311,099. Patented Jan. 20, 1885.

Witnesses:
C. Sedgwick
A. H. Davis

Inventor:
E. P. Baville
By Munn & Co
Attorneys.

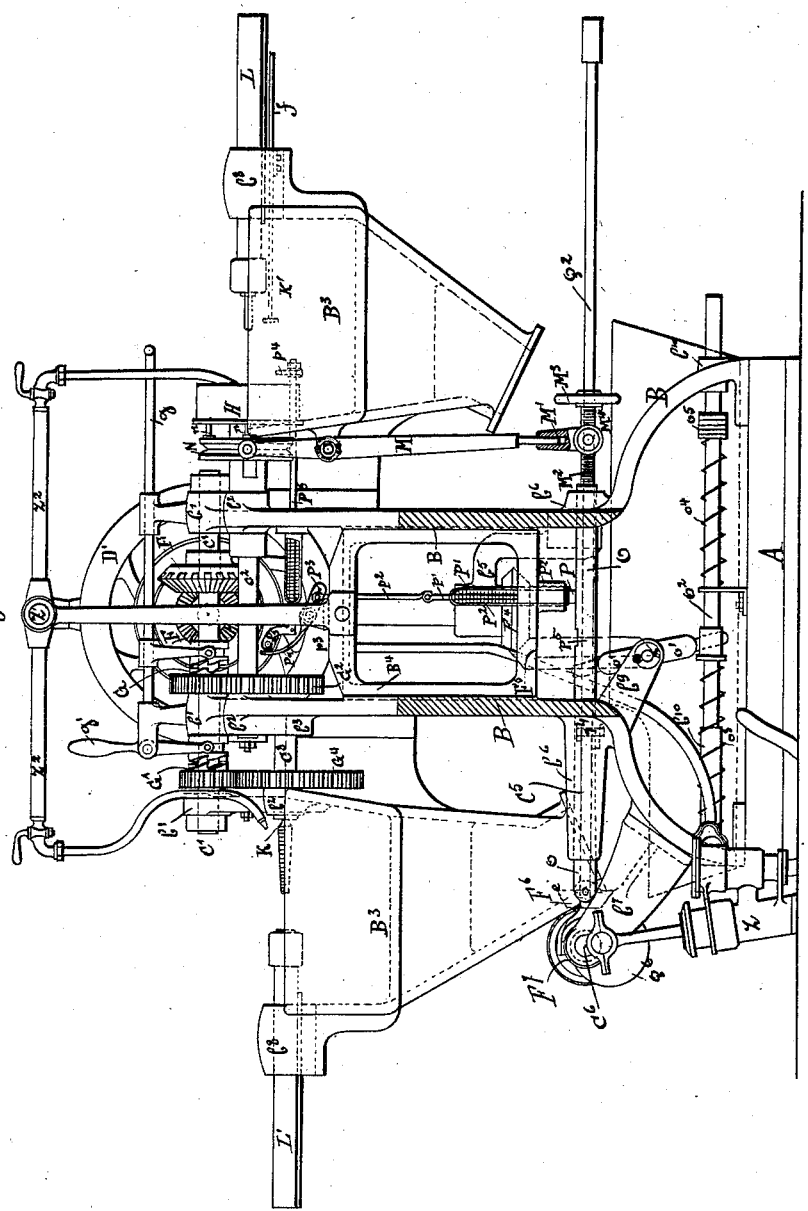

(No Model.) 8 Sheets—Sheet 4.
E. P. BAVILLE.
MACHINE FOR THREADING SCREWS, BOLTS, AND NUTS.
No. 311,099. Patented Jan. 20, 1885.
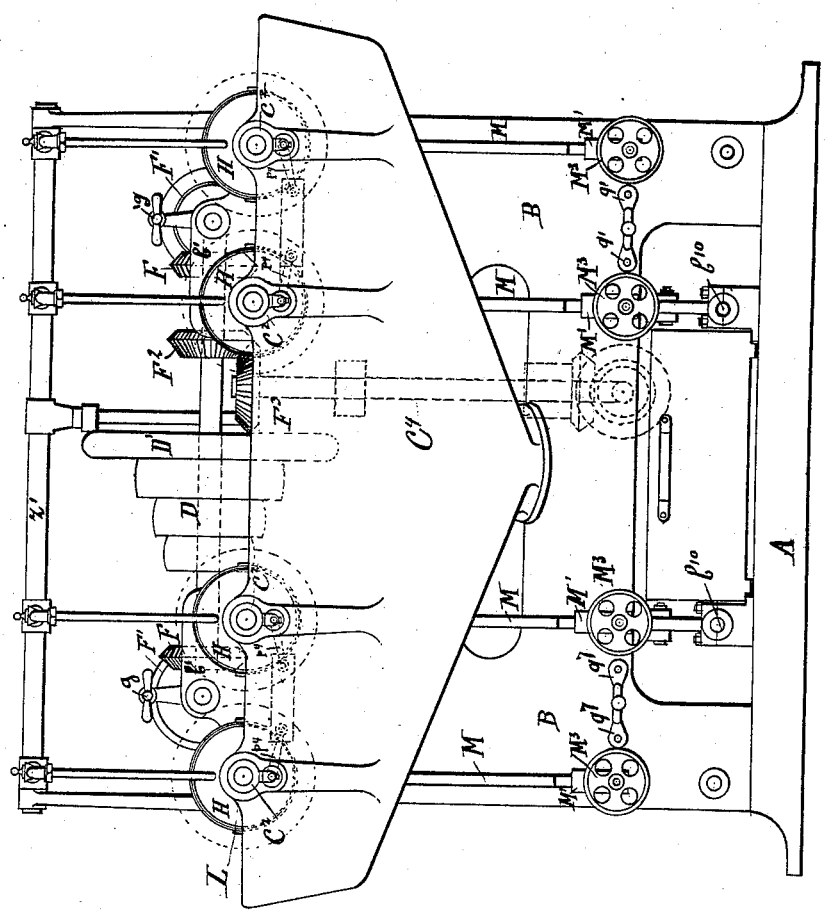
Witnesses:
C. Sedgwick
A. H. Davis
Inventor:
E. P. Baville
By Munn & Co.
Attorneys.

(No Model.)  8 Sheets—Sheet 5.
E. P. BAVILLE.
MACHINE FOR THREADING SCREWS, BOLTS, AND NUTS.
No. 311,099. Patented Jan. 20, 1885.
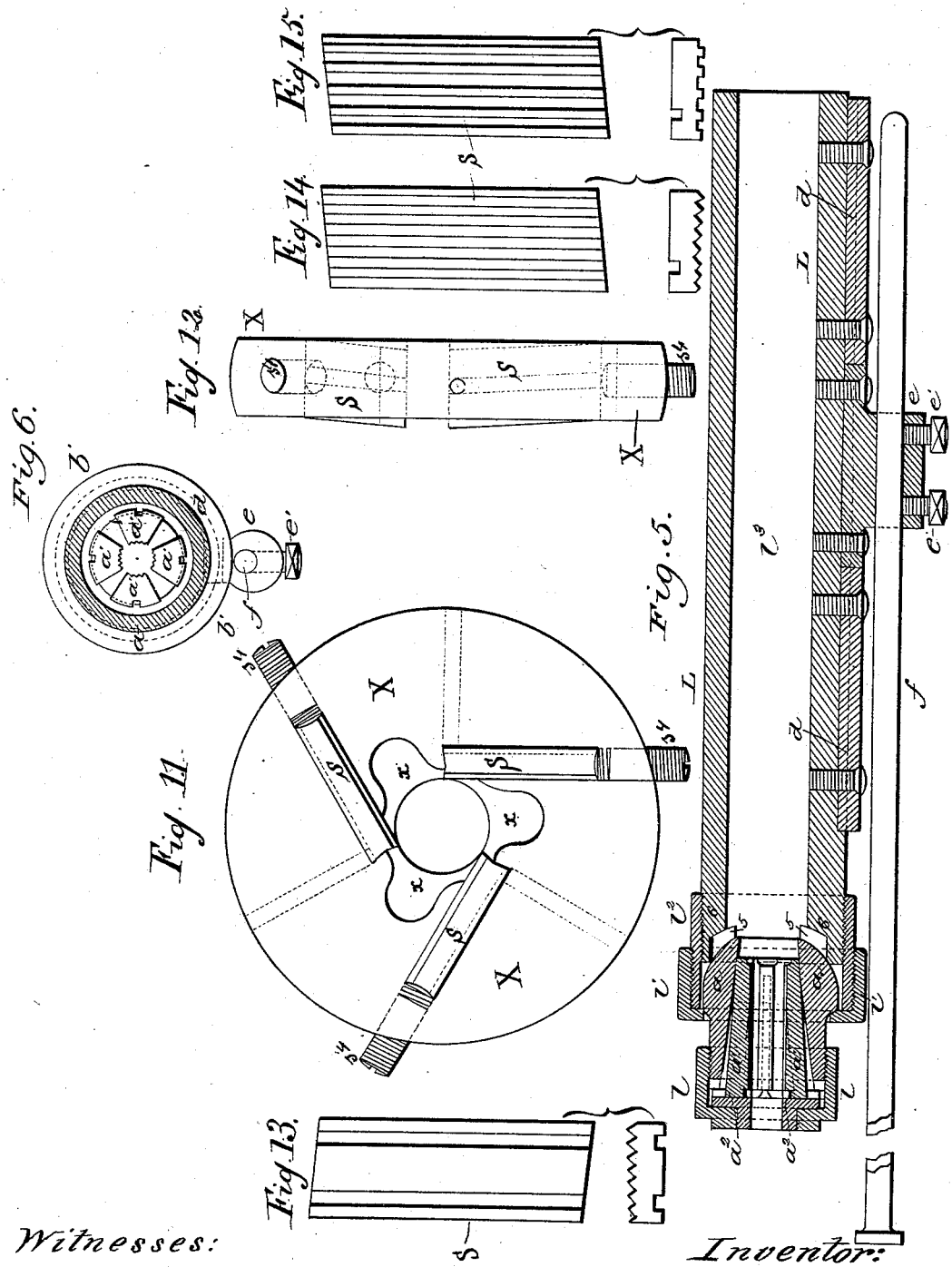
Witnesses:
C. Sedgwick
A. H. Davis
Inventor:
E. P. Baville
By Munn & Co.
Attorneys (No Model.) 8 Sheets—Sheet 6.
E. P. BAVILLE.
MACHINE FOR THREADING SCREWS, BOLTS, AND NUTS.
No. 311,099. Patented Jan. 20, 1885.
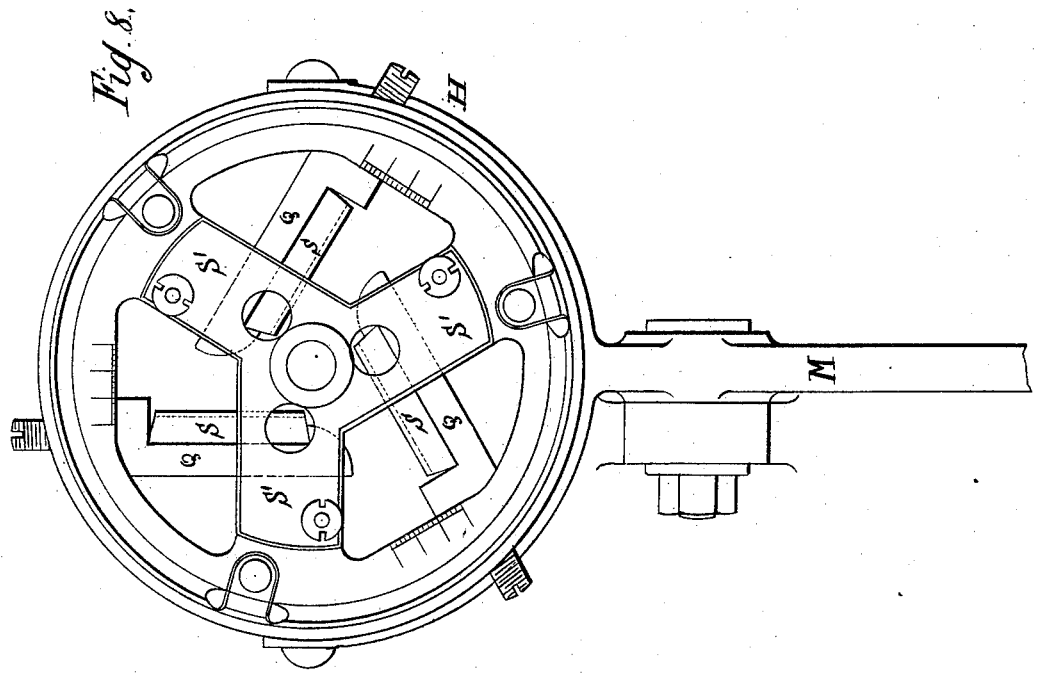
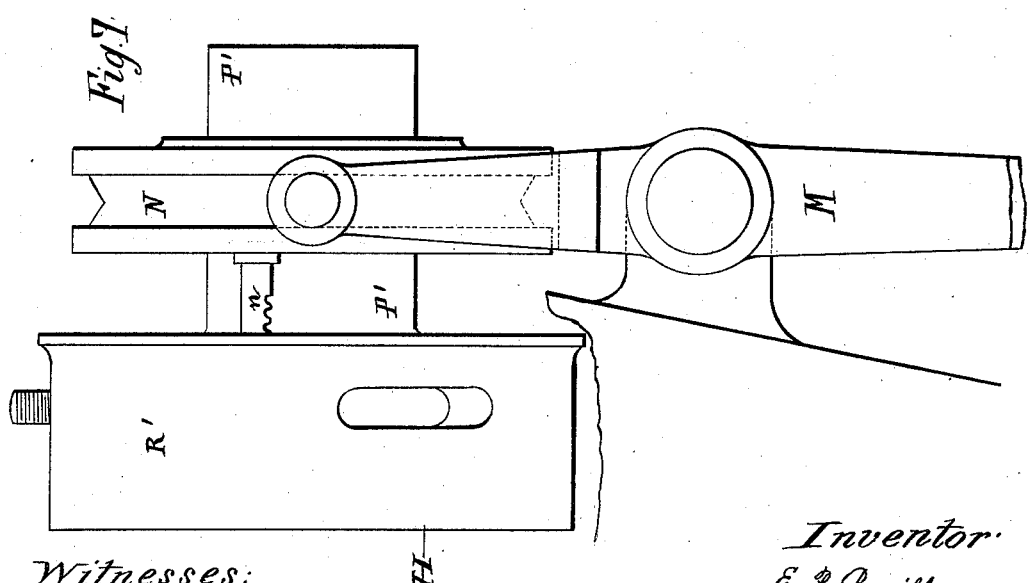
Witnesses:
C. Sedgwick
A. H. Davis
Inventor:
E. P. Baville
By Munn & Co
Attorneys.

(No Model.) 8 Sheets—Sheet 7.
E. P. BAVILLE.
MACHINE FOR THREADING SCREWS, BOLTS, AND NUTS.
No. 311,099. Patented Jan. 20, 1885.

Witnesses:
C. Sedgwick
A. H. Davis

Inventor:
E. P. Baville
By Munn & Co
Attorneys.

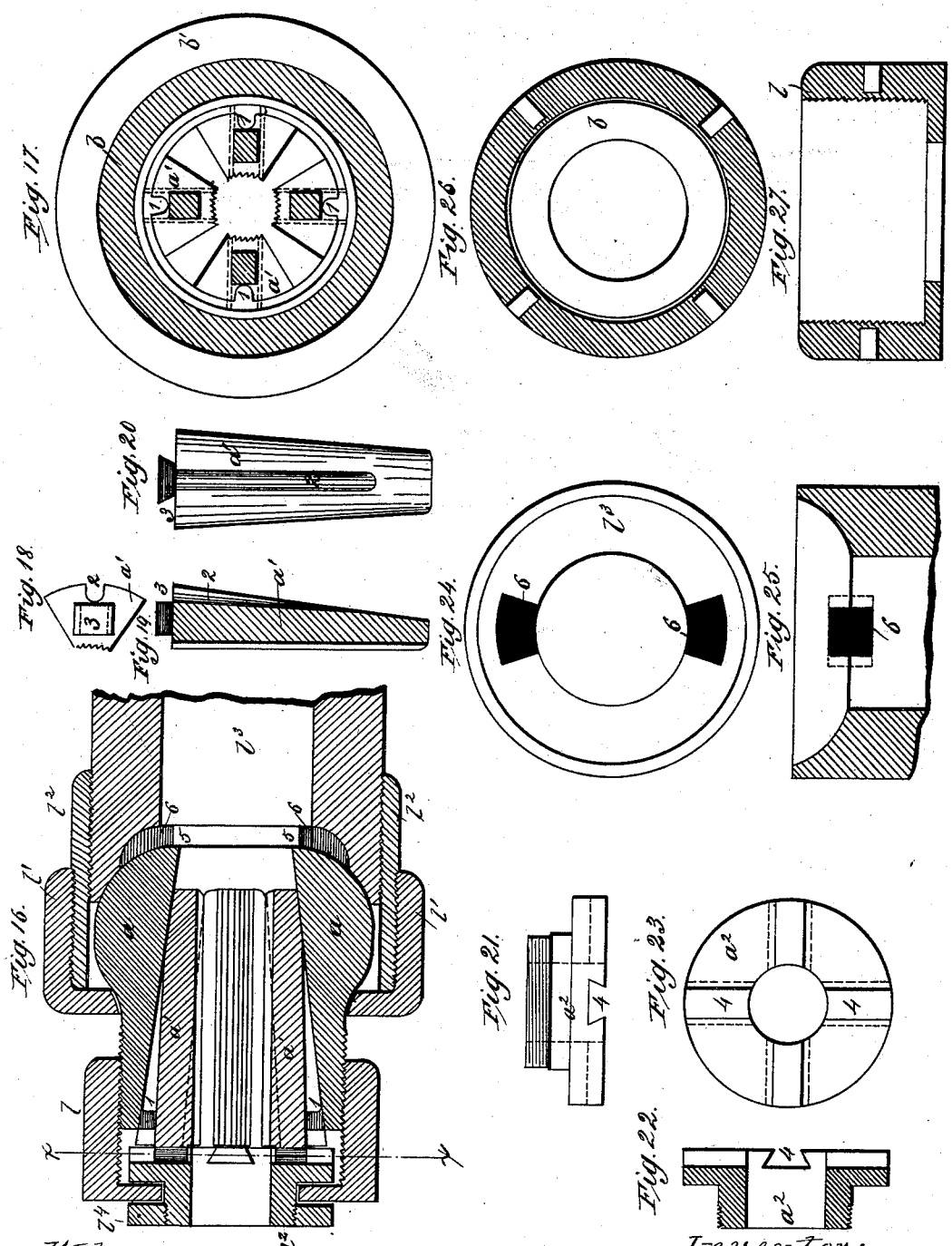

UNITED STATES PATENT OFFICE.

EDMOND PIERRE BAVILLE, OF BRUSSELS, BELGIUM.

MACHINE FOR THREADING SCREWS, BOLTS, AND NUTS.

SPECIFICATION forming part of Letters Patent No. 311,099, dated January 20, 1885.

Application filed November 24, 1883. (No model.) Patented in Belgium November 28, 1882, No. 59,688, and in France December 21, 1882, No. 152,788.

*To all whom it may concern:*

Be it known that I, EDMOND PIERRE BAVILLE, of the city of Brussels, Belgium, have invented new and useful Improved Machinery for Threading Screws, Bolts, and Nuts, of which the following is a full, clear, and exact description.

This improved machinery for threading screws in general, and especially screw-bolts, has for its object to impart to the manufacture of screws of all kinds, and especially of screw-bolts, greater rapidity, considerable economy, and above all greater accuracy; and to this end the invention consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1:
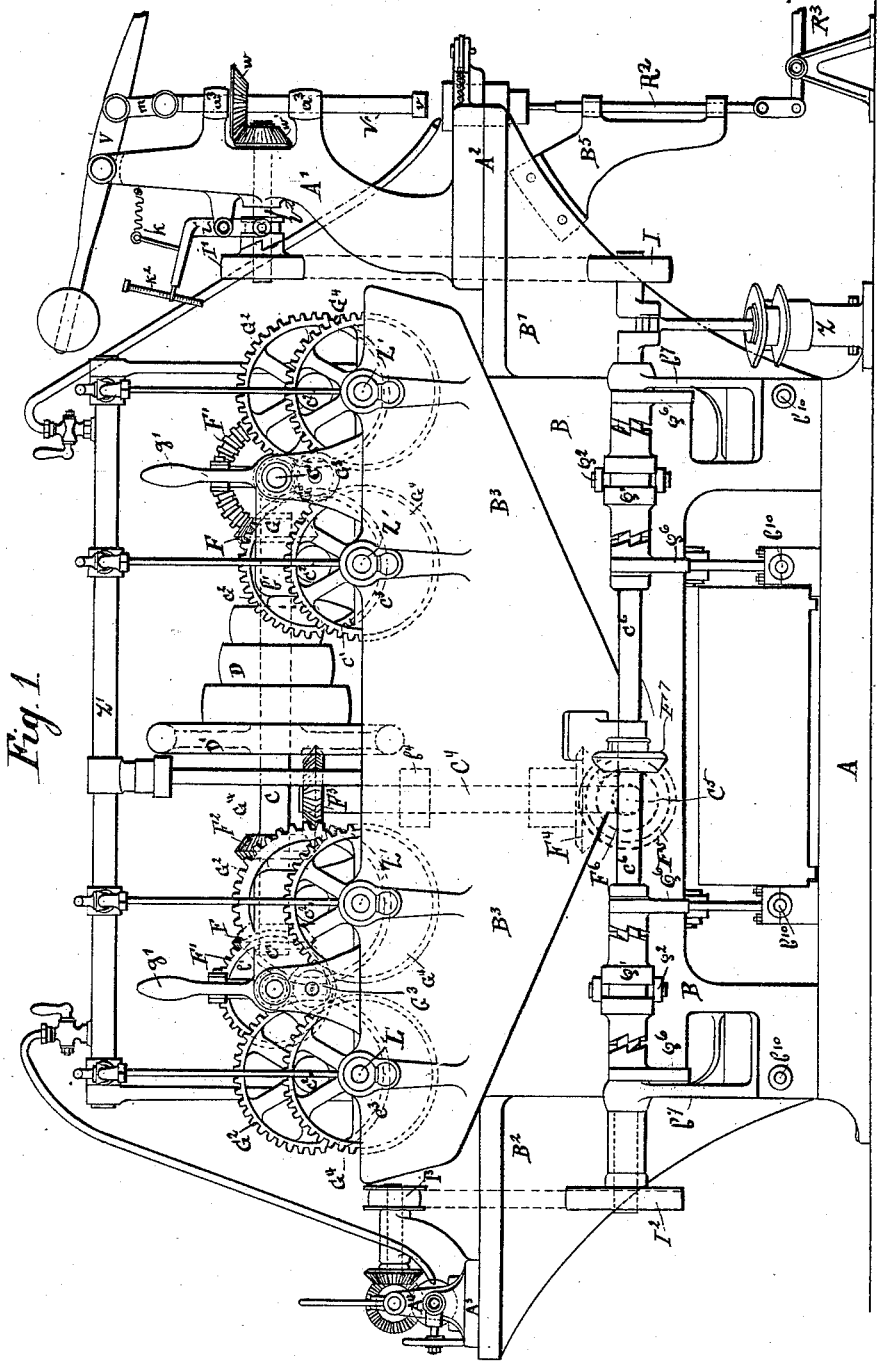
Figure 2:
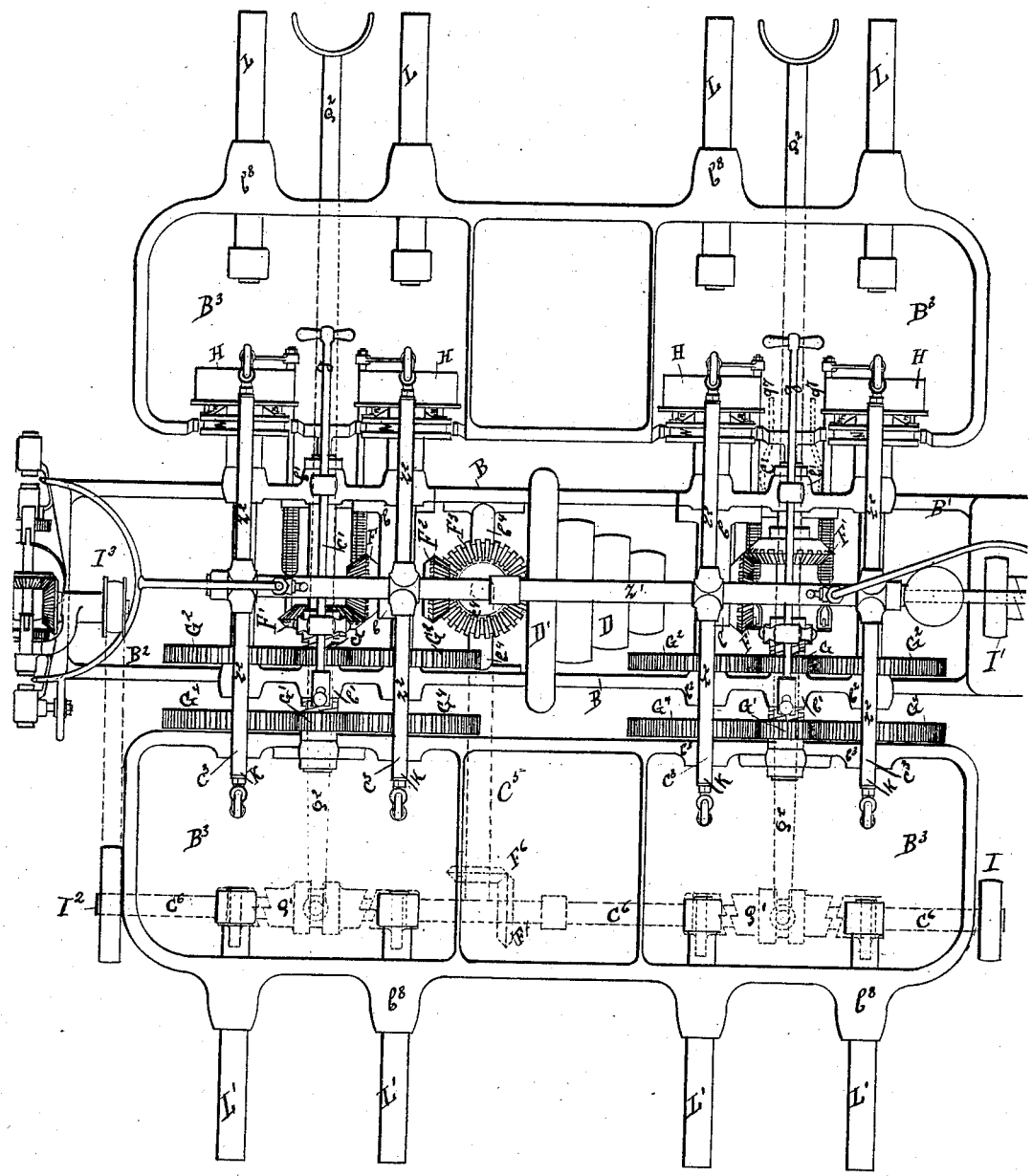
Figure 10:
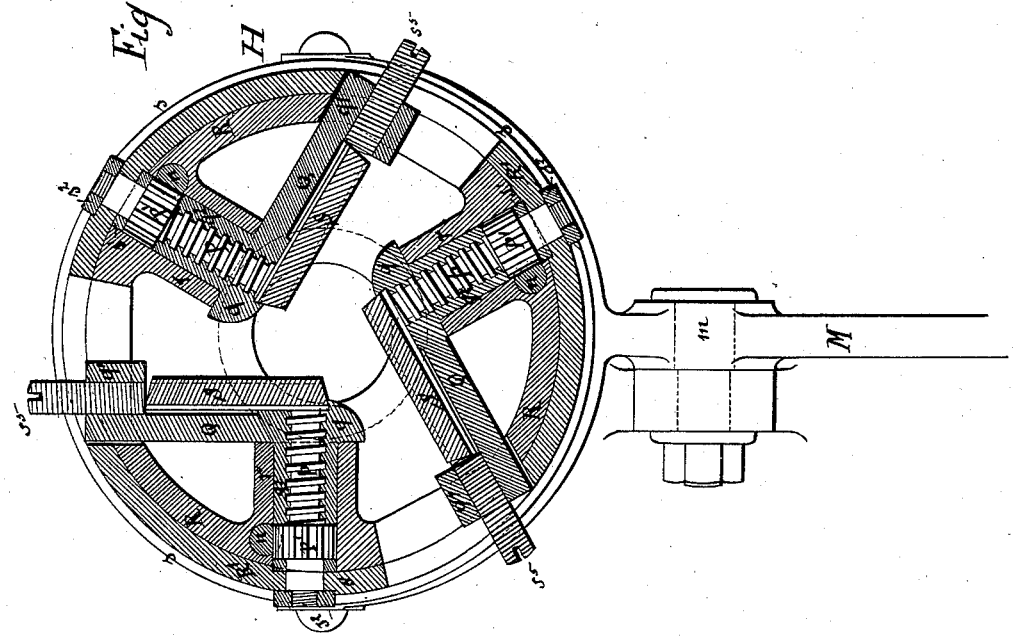
Figure 9:
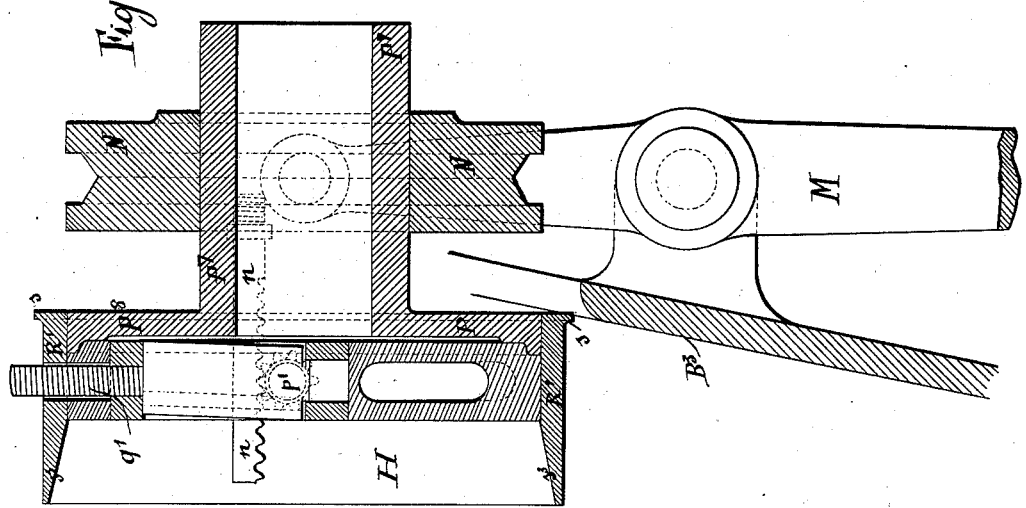

Figure 1, Sheet I, is a front elevation of my improved machine; Fig. 2, Sheet II, a plan view of the same; Fig. 3, Sheet III, a side elevation partly in section; Fig. 4, Sheet IV, a rear elevation showing the side of the die-stocks or screw-plates; Figs. 5 and 6, Sheet V, sectional views of the sliding bolt-holder; Figs. 7 and 8, Sheet VI, elevation views of the adjustable die-stock or screw-plate; Figs. 9 and 10, Sheet VII, sections of the same showing its interior arrangement; Figs. 11 and 12, Sheet VIII, views of a fixed standard screw-plate; Figs. 13, 14, and 15, Sheet VIII, views of the adjustable universal cutting-tool. Fig. 16, Sheet IX, is a longitudinal section of the bolt-holder head. Fig. 17, Sheet IX, is a section on line $x\ x$, Fig. 16. Figs. 18, 19, and 20, Sheet IX, are end sections and plan views, respectively, of the gripping-jaws. Figs. 21, 22, and 23, Sheet IX, are plan, section, and side elevation, respectively, of the ring provided with dovetail slots in which the dovetail ends of the gripping-jaws slide. Figs. 24 and 25, Sheet IX, are end and sectional views of the holder, showing the notches in which the stops on the globulous heads fit. Figs. 26 and 27, Sheet IX, are plan and sectional views of the adjusting-nut.

In the present instance the machine is arranged in such a manner as to thread four bolts, and I have shown on the opposite side of the machine means for tapping nuts, and at opposite ends of the machine, mechanism for turning the stems of bolts, and mechanism for shaping the faces of the nuts and the bolt-heads. These devices, however, form no part of the present invention.

On a foundation-plate, A, which contains a reservoir or tank for the water to be distributed to each tool, are securely mounted the frames B B, connected together by the cross-pieces $B^4$.

On the side frames, B, are fastened in any convenient manner the brackets B' and $B^2$, supporting, respectively, the bolt-turning and head and nut shaping devices, Figs. 1, 2, and 3. Cast-iron tanks or receptacles $B^3$, provided with a false bottom, which is perforated with holes and covered with coarse canvas, so as to filter the water which has been used for cooling the tools and which is returned constantly to the reservoir, while the finished article and the turnings remain in the receptacles $B^3$, project laterally on each side of the frames B B. The driving-shaft C is longitudinally mounted in the center of machine in bearings fastened upon brackets $b$, cast with the frame, which can only be seen in the plan view, Fig. 2. The driving-shaft C receives its rotary motion from the graded pulley D, on the side of which is secured a fly-wheel, D', in order to regulate the movement.

At the ends of the shaft C are the bevel-wheels F, which engage with corresponding wheels, F', operating the two transverse shafts C' C', the bearings of which are in bosses $b'\ b'$ on stands upon the frames, and each of these shafts operates simultaneously two die-stocks or screw-plates, H, situated on one side of the machine, and two tap-holders, K, on the other side of the same, by means of the pinions G G G' G', provided with coupling-clutches. The two spur-pinions G G, which operate each, respectively, two corresponding wheels, $G^2\ G^2$, (one for each die-stock,) are loosely fitted upon the shafts C' C' when they are disengaged with their corresponding clutch; but as soon as this latter is engaged with the said pinions, (which operation is performed by pulling simply on the horizontal rod $g$,) they will rotate with their shafts and operate the wheels $G^2$ $G^2$, in order to revolve the screw-stocks H, the shafts of which $C^2$ $C^2$ are mounted in the same manner as the shafts $C'$ $C'$, there being one on each side of each shaft $C'$ and at equal distances therefrom. The other two pinions, $G'$ $G'$, which serve to give motion to the tap-holders, K, are also loose on their shafts $C'$ $C'$, and may be engaged by pulling on the forked hand-lever $g'$. The pinions $G'$ $G'$ engage with intermediary pinions, $G^3$ $G^3$, turning loosely on studs projecting from the stands $b'$, in order to act upon the wheels $G^4$ $G^4$, the shafts of which $C^3$ $C^3$ are situated underneath the shafts $C^2$ $C^2$ of the screw-plates, and do not extend through the whole width of the machine, but are mounted in bosses $b^3$ $b^3$ on the receptacle $B^3$ and the frame at one side of the machine. The driving-shaft C has besides the bevel-wheels F at its ends, another bevel-wheel, $F^2$, fixed on its middle, which engages with a corresponding wheel, $F^3$, the top end of a vertical shaft, $C^4$, which has its upper bearing in a cross-piece, $b^4$, of the frames, and its lower one in a bracket, $b^5$, projecting from the frame. The bevel-wheel $F^4$ on its lower end engages with a corresponding wheel, $F^5$, on the inner end of a horizontal transverse shaft, $C^5$, which has its bearings $b^6$ on the lower part of the frame. The wheel $F^6$ on the outer end of this shaft drives a longitudinal shaft, $C^6$, the bearings of which are mounted in brackets $b^7$, connected with the frames. A pulley, I, at one end of this shaft gives motion to the stem-turning mechanism by means of a belt or strap acting upon a pulley, $I'$, on the main shaft of this apparatus, and a pulley, $I^2$, at the other end operates the pulley $I^3$ on the driving-shaft of the bolt-head and nut-shaping mechanism.

Having now given a general insight of the operating action of the various arrangements, the different parts and their special working will be separately described, and in order to proceed regularly I will first show the sliding bolt-holder in all its details.

The sliding bolt-holder L is represented on a larger scale in Figs. 5 and 6 of Sheet V, and in Figs. 16, 17, 18, 19, 20, 21, 22, 23, 24, 25, 26, and 27 of Sheet IX. The bolt-holder proper consists of a cylindrical box having a globulous head, $a$, held on the end of the tube $l'$ by the nut $l'$, screwed on the sleeve $l^2$, which in turn is screwed on the tube $l^3$. The bore of the said box is tapering from its inner to its outer end, and said box is provided with inwardly-projecting lugs 1 on its outer end, to enter the grooves 2 of the four gripping-jaws $a'$, which slide in the said box, and are provided with dovetail-shaped ends 3. The dovetail ends 3 of the gripping-jaws work in radial dovetail slots 4 of the flanged and threaded ring $a^2$. A flanged nut, $l$, is screwed on the outer end of the head $a$, with its flange outside of the flange of the ring $a^2$, and a nut, $l^4$, is screwed on the end of the said ring $a^2$. The inner end of the head $a$ is provided with lugs 5, which enter notches or recesses 6 in the end of the tube $l^3$. By this construction the head, while it is prevented from turning, yet is free to follow all the movements of the bolt, and by advancing or withdrawing the nut $l$, the gripping-jaws $a'$ are brought together or spread out without leaving the ring $a^2$, by sliding up and down on the faces of the conical hollowed box $a$, and thus clamp the stems or heads of bolts between them, so as to perfectly center and firmly secure them in the sliding bolt-holder L. The slides L, which may be of any convenient length, travel in bosses $b^8$ cast on the receptacles $B^3$, so as to slide longitudinally in these latter under the pull of the bolt in course of threading, and to prevent their turning. The feather $d$ on the slide is guided in a groove of the boss $b^8$. At the middle of the feather $d$ is fixed on the slide a small bearing, $e$, in which the rod $f$, with its tappet $k'$, the object of which will be hereinafter explained, is adjustable by means of screws $e'$. The sliding nut-holders $L'$ on the opposite side of the machine are guided identically in the same manner by means of a feather, $d$. It will be understood that the tap is provided with an ordinary square head, by means of which it is secured in the tap-holder K in order to rotate with this latter.

As I now will proceed to the description of the construction of the inner mechanism or devices of the die-stock or screw-plate H, I will first illustrate the cutting-tool S in its structure and multifariousness of its properties.

The universal adjustable cutting-tool illustrated on a larger scale in Figs. 13, 14, and 15, Sheet VIII, consists of a mere piece of a flat steel bar, in one side of which triangular or rectangular grooves, according to the thread to be made, are cut on a planing-machine or otherwise. It will be readily seen that by thus grooving the tool, ribs will be formed on it at any convenient distances apart and of any depth. As it is the amount of obliquity of the lower or cutting edge of the tool which determinds the pitch of the screws, any desired shape or bevel may be given in two directions to the tool by submitting it to the action of a grindstone. If it is desired to make a right-handed screw, the obliquity given to the cutting-tool is to the left, and if the thread is to be left-handed, the obliquity given to the cutting-tool is to the right. To make screws of two threads the obliquity is doubled, and for three threads, tripled.

It will be readily seen that perfectly true screws can be easily made with this kind of cutting-tool, because the pitch of the screw may be varied at will, which has never before been possible with any of the dies, screw-plates, or chasing-tools in existence. It will further be seen that by means of its peculiar adjustment in the screw-stock this tool will really cut the thread on the cylindrical surface of the rod or stem without compressing the latter or squeezing it between the tools, whereby the elongation of the rod and wringing of the thread is prevented. In a word, my universal cutting-tool does not rub, but it will cut as well at the heel as at the top of the thread, so as to cut the latter in a most precise manner on the metallic surface without otherwise affecting the rod, which has never before been possible by all existing chasing-tools. Even in cutting screw-threads in a lathe, the thread is not strictly true, because the screw to be threaded becomes heated during the operation and elongates, and when it is finished and cools down it shrinks again. By the arrangement of my improved tool all these difficulties are obviated, and for this reason I call my tool a "universal adjustable cutting-tool for threading screws." The so-prepared tools for cutting threads of all sections are then adjusted on the tool-holders in the die-stock H, which is represented in Figs. 7, 8, 9, and 10 of Sheets VI and VII.

The tool-holders Q are shown in section in Figs. 9 and 10. They are three in number in die-stocks for threading rods, the diameter of which does not exceed forty-five millimeters. For rods of greater diameter the number will increase to four, five, &c., according to the various diameters of the rods. It will be well understood that when the number of the tools in a die-stock H is increased, all proportions of this latter and of the whole machine should be increased accordingly. The tool-holders Q are provided at their inner ends with a projecting nose, $q$, against which will rest the end of the tool S, which is flatly placed against the tool-holder and firmly secured to this latter by a pressure-screw, $s^5$, passing through a projection, $q'$, on the outer end of the holder. When the tools are thus fastened to their holders they will be in a tangential position with respect to the rod or stem to be threaded, and it will be clearly seen that notwithstanding their powerful cutting in the surface of the rod by the revolutions of the die-stock they will not compress or squeeze the rod or stem. From the back of the tool-holder, near its inner end, and radially arranged with respect to the rod to be threaded, projects an innerly-threaded socket, $q^2$, which slides within a socket, $r$, on an iron ring, R. This latter is secured to the back plate, $P^8$, cast on the hub $P^7$ of the die-stock, Fig. 9. The whole is solidly champed in a hoop, R', having a rim, $s$. This small rim will prevent the turnings and other dirt falling behind the screw-plate.

With each of the threaded sockets $q^2$ engages a screw, $p$, provided with a pinion, $p'$, turning freely in the socket $r$, and kept in place by the two washers $s'$ $s^2$. The pinions $p'$ are actuated by means of racks $n$, traveling in horizontal holes in the screw-plate, and fastened to the engaging-sleeve N, sliding on the hub $P^7$ of the screw-plate. It will be seen that when the sleeve N is moved along the hub $P^7$ the racks $n$ will cause the pinions $p'$, with their screws $p$, to turn in the sockets $q^2$, and thus will bring the cutters nearer or draw them away from the center or from the rod to be threaded.

In ring R and hoop R' are provided slots in which the outer projections, $q'$, of the tool-holders are guided. The large portion or base of the projections $q'$ rests and slides against an inner straight portion of the ring R, Fig. 9. It will thus be seen that in order to withdraw the tools from the stem it will be sufficient to give a slow retrograding motion to the sleeve N to liberate the rod or bolt, which may then be easily removed from the die-stock.

To adapt the cutters to bolts of smaller or larger diameter, a similar sliding of the sleeve N is merely required without affecting their tangential position with respect to the rod or stem. A guide-plate, S', Fig. 8, for the rod or stem to be threaded is screwed upon the inner ring, R, after the cutters have been adjusted, to prevent the bolt from falling between the tools when it is disengaged. The turnings will fall upon the sloping edge $s^3$ of the hoop R', and thence into the receptacle $B^3$. The guide-plate S' is so formed that water can pass through to wash out the dies and carry away the turnings.

Figs. 11 and 12, Sheet VIII, represent a fixed standard screw-plate, combined by means of my cutting-tools. It consists of a circular plate, X, having a central aperture uniformly surrounded by the three projecting rests $x$, from which extend three slots, which are tangential to the central aperture. In these slots the tools S are inserted, the lower or cutting edges of which are channeled and rest on the cleats or projections $x$, against which they are pressed by means of the pressure-screws $s^4$ $s^4$, so as to be firmly held in place.

All the engaging and disengaging movements of the tools in the die-stock, as well as the movements for adjusting them to the diameter of the rods or stems, will be effected automatically by means of special mechanism hereinafter described. The lever M, Figs. 3, 7, 8, 9, and 10, is pivoted upon a bolt on a bracket cast on the tank $B^3$. The upper forked arm of this lever has on its ends studs which engage in the circular groove of the sleeve N. The longer under arm ends in a pin or plunger sliding in a hollow arm, M', which is pivoted upon a nut, $M^4$, on a screw, $M^2$, the latter having a hand-wheel, $M^3$. This screw turns freely within the disengaging-shaft O, in which it is kept in place by a circular groove on its surface, which embraces a transverse pin in the shaft O. This latter is supported in a laterally-projected socket and corresponding boss, $b^6$, and slides longitudinally in them. At the other end, opposite the screw $M^2$, the shaft is provided with a roller, $e$, and about in its middle it is traversed by a slot receiving the upper end of a rock-lever, O', pivoted to the bracket $b^9$ of the frame, the lower end of which lever passes in an identical manner through the pressure-shaft $O^2$, encircled by the spiral springs $o^3$ $o^4$, and sliding longitudinally in boss and socket $b^{10}$ $b^{10}$. $o^5$ $o^5$ are india-rubber washers, serving to break the shock or brunt of the shaft $O^2$. At one side of the rock-lever $O'$ the shaft $O$ is provided with a hollow, $p^5$, in which plunges (when the tools or dies S are engaged) the bolt P, keeping thus the shaft O in place and the dies ready for cutting.

Upon the bolt P acts a spiral spring, $P'$, lodged in a socket, $P^2$, and encircling the tie-rod $p'$, which is articulated with the connecting-rod $p^2$, pivoted to the right end of the lever $P^3$. This latter rocks on a bearing, $p^3$, connected to the frame in any convenient manner, and its left end or arm, $P^4$, serves as a strike to a roller fitted at one end of the arm $P^5$. This latter is transversely guided in the frame and forced to its normal position by the spiral spring which encircles the rod $P^6$, extending through the frame, and at the end of the said rod $P^6$ is mounted a finger or stop, $p^4$. All these arrangements are shown in Fig. 3, and for each die-stock H is provided such a disengaging mechanism conveniently fitted to the frame. Thus there are in the present instance four of these disengaging or die-actuating arrangements, and consequently four disengaging-shafts O with roller $e$.

In front of each of the rollers $e$ is mounted loosely on the constantly-rotating shaft $C^6$ a cam, $Q^6$, Figs. 1, 2, and 3. Two clutches, $Q'$ $Q'$, are also mounted on the shaft $C^6$, and each of these clutches is placed between two of the cams $Q^6$, and is so arranged that it may engage with a counterpart on each cam as required. Thus by pulling the clutches to the right or the left hand the corresponding cams will be engaged, which travel of the clutches $Q'$ will be effected by means of two levers, $Q^2$, pivoted on projections $q^4$ of the frame, Fig. 3, and extending through the whole machine, Fig. 2, in such a manner that it can be acted upon at the end opposite to the clutches by the knee of the workman. When the tools or dies S in the screw-plate H are engaged or shut—that is to say, when they are in position ready for cutting the thread on the rods or bolts—the bolt P, contrarily to its position shown in the drawings, is plunged in the notch $p^5$ of the disengaging-shaft O by the pressure of the spring $P'$, and the rock-lever $O'$ stands vertically between the two shafts O $O^2$, and springs $o^3$ $o^4$ of the latter bear heavily against collars of the shaft $O^2$. If, now, a rod or stem is to be threaded a certain definite length, it is fastened in the sliding bolt-holder L, previously described, and the rod $f$, with its tappet $k'$, is adjusted according to this length in its bearings $e$. The die-stock as it rotates and threads the rod acts as a nut and draws inward the said rod, together with the slide L, in which it is held until the tappet $k'$ meets the finger $p^4$ of the rod $P^6$, connected to the arm $P^5$, the roller of which strikes now against the lever-arm $P^4$ and raises the rods $p^2$ $p'$ and the bolt P. Through this lifting of the bolt P the disengaging-shaft O becomes free and the springs $o^3$ $o^4$ on the shaft $O^2$ impel this latter toward the right hand, which movement is transmitted in the opposite direction by the intermediary rock-lever, $O'$, to the disengaging-shaft O, which moves toward the left hand. By this movement it has rocked, by means of the pivoted arm $M'$, the lever M and caused the sleeve N to slide on the hub of the die-stock in order to actuate, by means of the racks $n$, the pinions $p'$ on screws $p$, Fig. 10, which will thus retract the tool-holders Q and disengage the dies S.

To engage again the dies or cutting-tools on a fresh bolt, the workman presses his knee against the lever $Q^2$ to turn it to the right or left hand, according to the die stock or plate to be operated, and the clutch $Q'$ on the shaft $C^6$ will gear with the cam $Q^6$, which, by its rotary motion, bears or strikes vigorously against the roller $e$ on the shaft O and thrusts the latter back. The bolt P will plunge again into the notch $p^5$, and the shaft O is again secured and the dies engaged until the bolt P is again raised. As a single revolution of the cam $Q^6$, by acting against the roller $e$, will be sufficient to thrust back the disengaging-shaft O to its normal position, the clutch $Q'$ is brought again to its central position, when the workman releases the lever $Q^2$ by means of flat springs $q^7$, arranged on each side of the latter, and these springs are shown in Fig. 4. These springs press against the levers when they are under pressure of the workman's knee, and therefore pull them back to the middle as soon as released from the pressure of the knee.

In order to adjust the dies or cutting-tools, as required by the different diameters of rods or stems to be threaded, the hand-wheel $M^3$ is turned either to the right or left, according as to whether a larger or smaller rod is to be operated upon. It will be readily understood that the necessary movements are effected by the displacement of the adjustable nut $M^4$.

As all the movements are made with rapidity, by means of a machine thus constructed, with four die-stocks and four taps, which is the preferred type, can be made eight thousand to nine thousand bolts a day of ten hours work.

It will be readily seen that by modifying the proportions of the whole mechanism rods of any desired length and diameter may be easily threaded; but when very thick bars are to be threaded I prefer another type of the machine, arranged with two die-stocks and having a fly-wheel on each side, and for working very small bolts or screws I use machines provided only with a single small screw-plate. In a word, my die-stock or screw-plate, with universal adjustable cutting-tools, is applicable in all various manners to the threading of the smallest bolts, and also to the threading of the thickest bars or spindles.

The stem-turning mechanism shown at the right of Fig. 1 consists of chuck $v$ on the lower end of shaft $v'$, journaled in projections $a^3$ $a^3$ on the frame $A'$, secured upon the support $B'$ of the frame B, for holding the head of the bolt and a cutter secured to the base $A^2$ of the frame $A'$. The shaft $v'$ is driven from the shaft $c^6$, by means of a belt from the pulley I on said shaft $c^6$ to a pulley, $I'$, on the shaft $v^2$, provided with a bevel-wheel, $w'$, meshing with the bevel-wheel $w$ on shaft $v'$. The pulley $I'$ on the shaft $v^2$ is locked to the shaft by a clutch, the movable portion of which is controlled by a forked lever, $i$, and a spring, $k$, attached to a pin projecting from said lever and to the frame $A'$. The outer end of the lever $i$ is provided with a screw, $K^2$. The clutch is disengaged by a weighted lever, V, pivoted to the top of the frame $A'$ and connected to the shaft $v'$ by link $m$ swiveled to said shaft. A plunger, $R^2$, operated by the treadle $R^3$, is employed for forcing the bolt out of the cutter W.

Mechanism for shaping the faces of the nuts and heads of bolts (shown at the left-hand side of Fig. 1) is mounted on a frame, $A'' A^3$, supported on the bracket $B^2$, projecting from the main frame of the machine, and is operated by a belt from the pulley $I^2$ on the shaft $C^6$, passing around the pulley $I^3$ on a shaft of said mechanism.

A forcing-pump, $z$, is acted upon by a crank of the shaft $C^6$, and raises the soap-water or other liquid serving to lubricate or to cool the tools in a tube or tubes, $z'$, extending longitudinally over the machine, and having connected to it the transverse feeding-tubes $z^2$, which lead the water to the several tools or cutters in work by means of secondary tubes or waste-pipes.

I claim—

1. In a machine for forming screw-threads, the combination, with the die-stock H, of the cutter-holders Q, the screws $p$, and the means, substantially as described, for operating said screws, substantially as herein shown and described.

2. In a machine for forming screw-threads, the combination, with die-stock H, provided with the holders Q, carrying cutters S, of the screws $p$, provided with the pinions $p'$, the racks $n$, and the means for operating said racks, substantially as herein shown and described.

3. In a machine for forming screw-threads, the combination, with the die-stock H, provided with the hub $P^7$, of the holders Q, the cutters S, the screws $p$, provided with pinions $p'$, the racks $n$, the sliding sleeve N, the pivoted lever M, and the means for vibrating said lever, substantially as herein shown and described.

4. In a machine for forming screw-threads, the combination, with the die-stock H, the sleeve N, and the means for operating the cutters of said die-stock from the sleeve of the lever M, the pivoted arm $M'$, the screw $M^2$, the wheel $M^3$, the nut $M^4$, the shaft O, the cam $Q^6$, the knee-lever $Q^2$, the shaft $C^6$, and clutch $Q'$, substantially as herein shown and described.

5. In a machine for forming screw-threads, the combination, with the die-stock H, the shaft O, provided with the notch $p^5$, the cam $Q^6$, the screw $M^2$, and the intermediate mechanism for operating the cutters of the die-stock, of the sliding bolt-holder L, carrying tappet $k'$, the spring-pressed rod $P^6$, provided with arms $p^4 p^5$, the lever $P^3$, provided with the arm $P^4$, the spring-pressed bolt P, and connecting-rod $p' p^2$, substantially as herein shown and described.

6. In a machine for forming screw-threads, the combination, with the die-stock H and the sliding bolt-holder L, carrying tappet $k'$, of the spring-pressed rod $P^6$, provided with the arms $p^4 p^5$, the lever $P^3$, provided with arm $P^4$, connecting-rods $p^2 p'$, spring-pressed bolt P, shaft O, having notch $p^5$, shaft $O^2$, having springs $o^3 o^4$ surrounding it, rock-lever $O'$, cam $Q^6$, and the intermediate mechanism for communicating the movement of shaft O to the cutters of the die-stock, substantially as herein shown and described.

7. In a machine for forming screw-threads, the combination, with the tube $l^3$ and the head $a$, of the sliding gripping-jaws $a'$, the nut $l$ and the ring $l^4$, substantially as herein shown and described.

The foregoing specification of my improved machinery for turning, screwing, and shaping bolts and nuts signed by me this 9th day of August, 1883.

EDMOND PIERRE BAVILLE.

Witnesses:
AUG. FORISSEN,
EMILE HUYTS.